United States Patent [19]
Morton

[11] Patent Number: 4,724,316
[45] Date of Patent: Feb. 9, 1988

[54] TEMPERATURE INDEPENDENT FIBER OPTIC SENSOR

[75] Inventor: Randall E. Morton, Redmond, Wash.

[73] Assignee: Eldec Corporation, Lynnwood, Wash.

[21] Appl. No.: 754,648

[22] Filed: Jul. 12, 1985

[51] Int. Cl.[4] .................... G01B 11/16; G01D 5/26
[52] U.S. Cl. .............................. 250/227; 250/231 R; 350/96.29
[58] Field of Search .............. 250/227, 231 R, 231 P; 73/655, 705, 800; 350/96.29

[56] References Cited

U.S. PATENT DOCUMENTS

| | | | |
|---|---|---|---|
| 4,071,753 | 1/1978 | Fulenwider et al. | 250/227 |
| 4,163,397 | 8/1979 | Harmer | 73/800 |
| 4,235,113 | 11/1980 | Carome | 73/655 |
| 4,238,856 | 12/1980 | Bucaro et al. | 455/614 |
| 4,294,513 | 10/1981 | Nelson et al. | 350/96.29 |
| 4,295,738 | 10/1981 | Meltz et al. | 73/800 |
| 4,297,684 | 10/1981 | Butter | 340/557 |
| 4,313,192 | 1/1982 | Nelson et al. | 370/4 |
| 4,342,907 | 8/1982 | Macedo et al. | 250/227 |
| 4,358,678 | 11/1982 | Lawrence | 250/227 |
| 4,408,495 | 10/1983 | Couch et al. | 73/655 |
| 4,436,995 | 3/1984 | Whitten | 250/227 |
| 4,564,289 | 1/1986 | Spillman, Jr. | 250/231 P |

OTHER PUBLICATIONS

Yamamoto et al, "High-Modulus Low-Linear-Expansion-Coefficient Loose-Jacket Optical Fibers"; Journal of Lightwave Technology; vol. LT-2, No. 2, Apr. 1984, pp. 83–87.
Specification sheet for a buffer coated fiber optic waveguide manufactured by Spec Tran Corporation under the trademark SPECTRAGUIDE (11/83).
Pp. 91, 94 and 96 from "Laser Focus/Electro-Optics" (12/84).

*Primary Examiner*—Edward P. Westin
*Attorney, Agent, or Firm*—Christensen, O'Connor, Johnson & Kindness

[57] ABSTRACT

Disclosed is an improved fiber optic sensor of the type in which a fiber optic waveguide component of the sensor is configured to be responsive to an external parameter such that curvature of the fiber optic waveguide is altered in response to forces induced by changes in the external parameter being sensed. The alteration of the curvature of the fiber optic waveguide causes variations in the intensity of light passing therethrough, these variations being indicative of the state of the external parameter. The improvement comprises coating material covering the exterior portion of the fiber optic waveguide, the coating material having an expansion coefficient and thickness such that distortion of the fiber optic waveguide caused by thermally induced stresses between the coating material and the glass fiber is substantially eliminated. Also disclosed is a support member for supporting the curved fiber optic waveguide, the support member and fiber optic waveguide being configured and arranged to minimize the effects of thermal stress tending to separate the waveguide from the support member.

18 Claims, 7 Drawing Figures

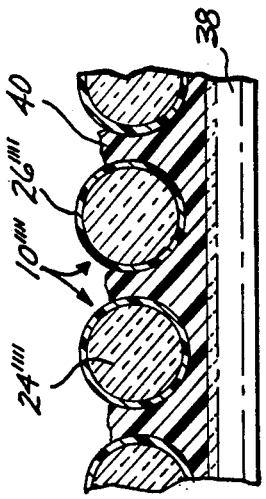
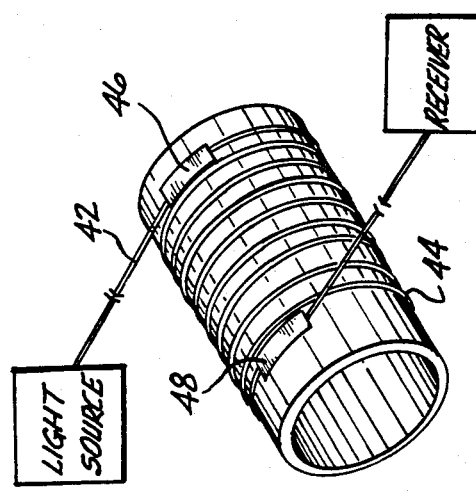
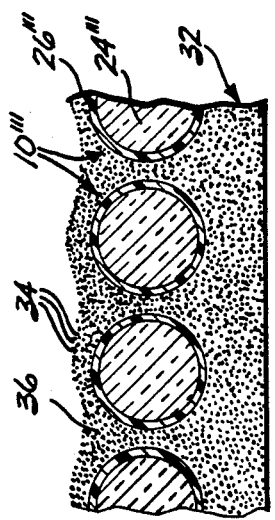
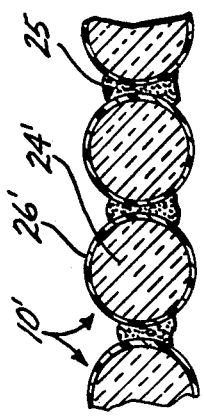
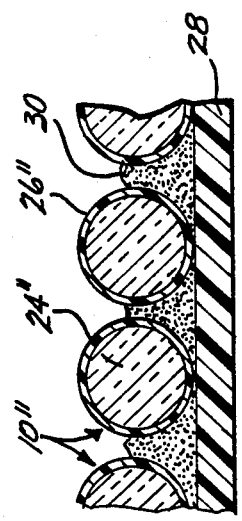

TEMPERATURE INDEPENDENT FIBER OPTIC SENSOR

TECHNICAL FIELD

This invention relates to a fiber optic sensor of the type in which a fiber optic waveguide component of the sensor is configured to be responsive to an external parameter such that the curvature of the fiber optic waveguide is altered in response to forces induced by changes in the external parameter being sensed. The alteration of the curvature of the fiber optic waveguide causes variations in the intensity of light passing therethrough, these variations being indicative of the state of the external parameter.

BACKGROUND OF THE INVENTION

The use of fiber optic sensors to determine the presence or magnitude of an external parameter is generally known in the art. One type of sensor is configured with a fiber optic waveguide that is interconnected between a light emitting source and a receiver. The waveguide comprises one or more optical fibers, each fiber including a glass core portion surrounded by a cladding (usually glass) with a relatively lower index of refraction. The cladding causes total internal reflection of light traveling in the core, thus trapping the light emitted from the source in the core of the fiber and allowing it to propagate with low loss over long distance.

A protective coating is applied to the glass fiber to protect it from chemical or mechanical damage that could reduce the transmissive qualities of the fiber. These protective coatings are generally composed of an epoxy acrylate and have a thickness betwen 0.5 and 1.5 times the fiber diameter so that they typically account for as much as 94% of the cross-sectional area of the coated fiber.

The coated waveguide is curved or coiled and typically mounted on a likewise curved support member. The curved support member is responsive to a mechanical element that is subject to movement caused by changes in the state of the external parameter. This movement, which is transmitted to the fiber optic waveguide, changes the curvature of the waveguide. The change in curvature results in a change in the intensity of the light transmitted by the light source through the fiber optic waveguide. That is, as the radius of curvature in a fiber optic waveguide decreases, the intensity of the transmitted light is increasingly attenuated. This type of attenuation, known as "bending loss" is generally attributed to radiation of the light out of the fiber at bent portions of the fiber optic waveguide.

The bending loss, determined by a straightforward comparison of the received and source signal, can be readily related to the position or magnitude of movement of the mechanical element, or to the force that caused that movement.

A typical example of a fiber optic sensor of the type just described is disclosed in the patent issued to Couch et al., U.S. Pat. No. 4,408,495. There, vibrational movement of the machine to which the fiber optic waveguide is linked causes the change in the waveguide's curvature.

The teachings of Couch and others recognize that use of fiber optic waveguides as sensor elements has several distinct advantages. Primarily, fiber optic sensors are immune to electromagnetic interference while not introducing such interference in and around the object being sensed. Since they are insulators, fiber optic sensors reduce the electrical hazard associated with sensing in high voltage environments. They also are light in weight and offer greater information carrying capacity than most electrical devices. Furthermore, compared to many electrical devices, fiber optic sensors of the type herein discussed are relatively inexpensive to construct and maintain.

SUMMARY OF THE INVENTION

While experimenting with fiber optic sensors constructed in accordance with the general principles described above, the inventor has discovered that problems arise when the sensor is employed in environments with extreme temperature ranges, for example, in military or space applications where sensors may be exposed to temperatures below $-65°$ C. and above $+175°$ C. The inventor has determined that conventionally formed fiber optic waveguide bending sensors subject to these temperature extremes exhibit unpredictable and nonrepeatable losses in transmitted light intensity that are not attributable to the parameter being sensed. The unpredictable occurrence and the nonrepeatability of these losses adversely affects the sensor's reliability.

Through subsequent experimentation, the losses were discovered to be attributable to substantial differential thermal stresses arising between the fiber and its coating when the sensor is subject to extreme heat or cold. The thermal stress developed in the thick protective coating produced bends in the fiber, thus creating bending losses similar to and indistinguishable from the losses caused by the parameter-induced bending of the waveguide. Furthermore, it was discovered that when the fiber optic waveguide was mounted to a relatively stiff support member (for example, stainless steel), the problem of differential thermal stresses was compounded. Particularly, at low temperatures the differential contraction stress that developed between the support member and the fiber optic waveguide caused buckling of the fiber with respect to the surface of the support member thereby inducing undesirable bending losses. This buckling often resulted in the fiber becoming detached from the support member, thereby being subject to significant fluctuations in its overall shape. The extent of the buckling and fluctuations and the losses attributable thereto are unpredictable and nonrepeatable.

In light of the recognition of the causes of the aforesaid problems, this invention is directed to an improved fiber optic sensor of the type in which a fiber optic waveguide is configured to be responsive to an external parameter, wherein the curvature of the fiber optic waveguide is altered in response to forces induced by changes in the external parameter, and wherein the fiber optic sensor is utilized in an environment that is subject to a wide range of temperature variations. As one aspect of his invention, the improvement comprises a coating material that is configured to account for less than 50% of the cross-sectional area of the coated fiber, thereby substantially minimizing the development of thermal stress in the coating which tends to cause the undesirable bending discussed above. As another aspect of the invention, the coating material is formed of material having an expansion coefficient in the range of $10 \times 10^{-6}$ to $50 \times 10^{-6}$ in/in/$°$ C., which is substantially less than that of conventional coatings.

As another aspect of this invention, the improved fiber optic sensor also includes a curved support member, wherein the fiber optic waveguide is affixed to the support member in such a manner that the longitudinal cross-sectional area of the support member is less than or equal to 50% of the cross-sectional area of the affixed waveguide. Preferably, the support member is formed of material having an expansion coefficient in the range of $10 \times 10^{-6}$ to $50 \times 10^{-6}$ in/in° C.

As another aspect of this invention, the support member can be formed of stiff but deformable material such as metal, the improvement including buffer material affixed between the support member and the fiber optic waveguide, the buffer material being configured to remain in continuous contact with both the support member and the fiber optic waveguide despite relative movement of the support member with respect to the fiber optic waveguide caused by differential thermal stresses. As still another aspect of the invention, in lieu of employing buffer material, the fiber optic waveguide is prestressed in tension when affixed to the stiff support member and will relax upon thermal contraction of the support member, thereby being made substantially inseparable from the support member.

BRIEF DESCRIPTION OF THE DRAWINGS

FIG. 3 is a cross-sectional view of a waveguide portion of one embodiment of a fiber optic sensor formed in accordance with this invention;

FIG. 4 is a cross-sectional view of a portion of a waveguide and support member of an alternative embodiment of a fiber optic sensor formed in accordance with this invention;

FIG. 5 is a cross-sectional view of a portion of a waveguide and support member of another alternative embodiment of a fiber optic sensor formed in accordance with this invention;

FIG. 6 is a cross-sectional view of a portion of a waveguide and support member of still another alternative embodiment of a fiber optic sensor formed in accordance with this invention; and FIG. 7 is a diagram of another alternative embodiment for a fiber optic sensor.

DETAILED DESCRIPTION

As noted earlier, the inventor has discovered that at very low or very high temperatures, fiber optic waveguides demonstrate a significant increase in bending losses created by relative movement of the fibers and their protective coating. The coatings are typically formed of epoxy acrylates that have relatively high expansion coefficients compared to glass. These coatings are usually thicker than the fiber itself, typically accounting for as much as 94% of the cross-sectional area of a coated fiber. This thick coating is applied to provide protection of the fiber from deflections, impacts, and abrasive forces that could distort or damage the fiber, thereby impairing its transmission properties.

The inventor discovered that when a fiber optic bending sensor was exposed to very low temperatures (e.g., $-65°$ C. or lower), or cyclically cooled and warmed to very high temperatures (e.g., 175° C. or higher) significant differential contraction of the protective coating with respect to the fiber took place, creating strong tensile forces on the glass fiber that resulted in bends being formed in the fiber and the attendant losses as mentioned earlier. Furthermore, at very high temperatures (e.g., $+175°$ C. or higher) expansion of the coating was found to cause some types of conventional coatings to separate from the fiber, detrimentally affecting the precision in which the fiber was secured to the support member.

The substantial thickness of conventional coatings exacerbates the differential thermal stress problem since the total thermal stress induced between the coating and fiber increases as the thickness of the coating increases.

The bending losses caused by the different expansion coefficients between the fiber and its thick coating are unpredictable and cannot be accurately distinguished from bending losses attributable to the change of the sensed parameter. Accordingly, the sensor's reliability is adversely affected.

As noted, the differential thermal expansion and contraction problem is compounded when a curved fiber optic waveguide is mounted to a support member that has an expansion coefficient unequal to that of the fiber. The resulting differential expansion and contraction causes buckling of the fiber with respect to the surface of the support member thereby inducing undesirable bending losses. This buckling often results in the fiber detaching from the contracted support member, thereby being subject to significant fluctuations in its overall shape. The extent of the buckling and fluctuations and the losses attributable thereto are unpredictable and nonrepeatable. Thus, calculations in order to account for these losses are unavoidably imprecise.

The following portion of this description describes the particular embodiments of an improved fiber optic sensor that incorporate solutions to the problems relating to the differential thermal effects discussed above.

Figure 1:
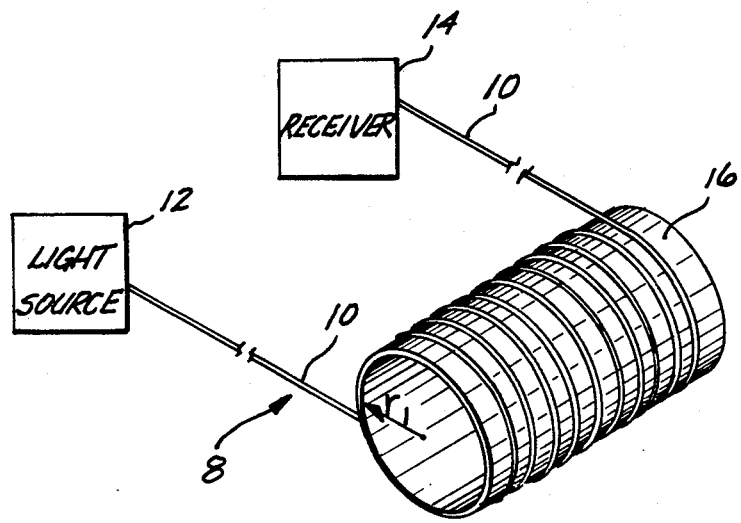
FIG. 1 is a diagram of the essential elements of a fiber optic sensing system to which this invention is directed.

FIG. 1 is a diagram of the essential elements of a fiber optic sensing system to which this invention is directed. Generally the sensor 8 comprises a fiber optic waveguide 10 interconnected between a light emitting source 12 and a receiver 14. Between the source 12 and receiver 14, the fiber optic waveguide 10 is coiled around a hollow cylindrical support member 16 having a radius $r_1$. Light source 12 can be any suitable device such as a light emitting diode that generates an optical signal for propagation through the fiber optic waveguide 10. Receiver 14 incorporates a photodetector, amplifier and other appropriate circuitry for detecting the optical signal and converting it into representative electrical signals. Such sources and receivers are well known in the art and comprise no part of this invention.

Generally, the operation of sensor 8 involves positioning the support member 16 in an environment where a parameter to be sensed is capable of distorting the shape of the support member when the state (i.e., position, pressure, etc.) of the parameter changes. The shape of the fiber optic waveguide 10 that is affixed to the support member 16 will be correspondingly distorted. Specifically, the sensor is configured so that a force, generated by the change in state of the parameter will be directed to cause alteration of the radius of curvature of both the support member and the attached fiber optic waveguide. As is well known in the art, changes in the curvature of a fiber optic waveguide will alter the intensity of the light propagating therethrough, thereby providing a readily detectable indication of the movement of the support member. This movement is then correlated to the state of the parameter.

Figure 2:
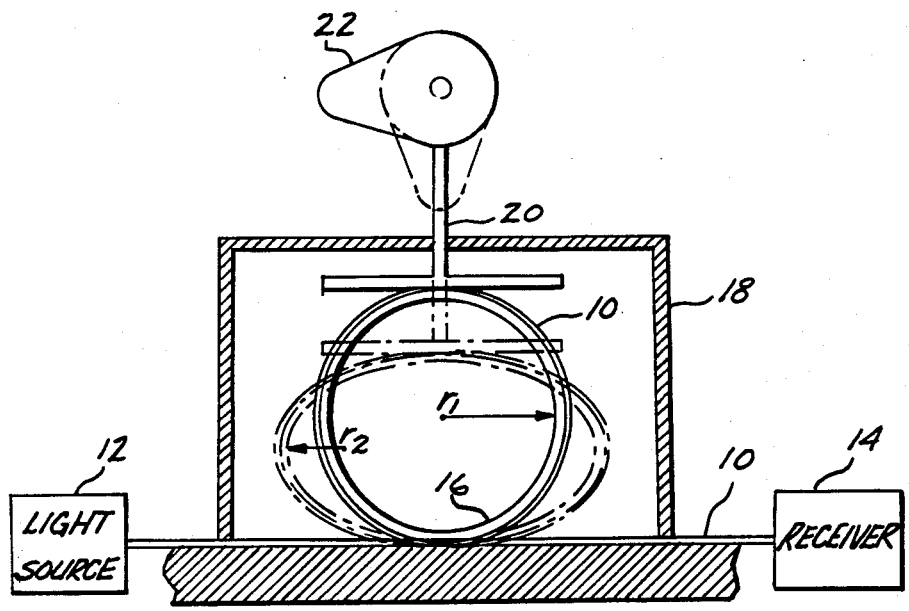
FIG. 2 is a schematic diagram of one particular embodiment of a fiber optic sensor.

FIG. 2 shows a schematic diagram of one method of employing the above-described system to detect the rotational movement or position of a cam 22. The cylindrical support member 16, which has the fiber optic waveguide 10 coiled in one or more turns around it, is enclosed within a housing 18. The opposing ends of the fiber optic waveguide are connected to the light emitting source 12 and receiver 14, respectively. A plunger 20, which has its translational movement controlled by its interaction with the rotating cam 22, bears upon the support member, causing changes in the cross-sectional shape of the support member depending upon the position of cam 22. When cam 22 is turned with its high point against plunger 20 (as shown in dotted lines in FIG. 2), the support member will be forced into an elliptical shape. The plunger's action thus reduces the minimum radius of the coiled fiber optic waveguide as depicted in the figure, where $r_1$ is the minimum radius of curvature of the fiber optic waveguide prior to distortion by the plunger, and $r_2$ is the minimum radius of curvature of the waveguide after distortion by the plunger. As noted earlier, such a reduction in the radius of curvature creates bending losses, which can be correlated to the changes in the parameter being sensed, in this case the position of cam 22.

A typical coiled waveguide and support member as just described is dimensioned with $r_1$ approximately equal to 0.5 inches and $r_2$ approximately equal to 0.3 inches after piston 22 is moved approximately 0.4 inches.

In some military, space, or industrial process control systems applications it is desirable to employ a sensor that performs effectively in temperatures below $-65°$ C. and above $175°$ C. (including temperatures therebetween). The extreme high and low temperatures result in the above-discussed problems of differential movement between the glass fiber and its protective coating, and separation of the waveguide from the support member (this latter problem occurring most often when the sensor is subjected to extremely low (temperatures).

One embodiment of a fiber optic sensor formed in accordance with this invention is directed to resolving the particular problem of differential contraction between the glass fiber and its protective coating. With reference to FIG. 3, illustrated there is a cross section of a coiled waveguide portion 10' of a fiber optic sensor. The waveguide 10' comprises a glass fiber 24' having a thin protective coating 26'. It is pointed out that for the purpose of this description the glass fiber includes the above-mentioned cladding and core, but is shown as a single unit. The fiber can be any conventional step index or graded index glass fiber such as the type manufactured by SpecTran Corporation of Sturbridge, Mass., under the trademark SPECTRAGUIDE.

The protective coating 26' is formed of a material having an expansion coefficient that is relatively lower than coatings of the past. In the embodiment shown in FIG. 3, the coating is a polyimide material. The polyimide coating is applied to the fiber by methods known in the art, which result in the coating being tightly adhered to the glass fiber.

The polyimide coatings 26' on adjacent fibers are secured to each other by a suitable adhesive 25. The adhesive employed to secure adjacent polyimide coatings is preferably a two-component epoxy phenolic type such as the adhesive manufactured by Vishay Intertechnology, Inc. of Raleigh, N.C., under the trademark M-BOND 610.

One suitable polyimide material is manufactured by Du Pont de Nemours, E. I. & Co. of Wilmington, Del., under the trademark KAPTON. This polyimide material has an expansion coefficient of $35 \times 10^{-6}$ in/in/° C. This expansion coefficient is relatively low compared to prior art coatings. For example, the expansion coefficient of a typical epoxy acrylate used for a fiber protective coating, such as polyester thermoplastic, is approximately $75 \times 10^{-6}$ in/in/° C. It is noted that the expansion coefficient of the coating 26' can vary from that just specified within limits of approximately $10 \times 10^{-6}$ to $50 \times 10^{-6}$ in/in/° C. The expansion coefficient of the glass fiber is typically less than $1 \times 10^{-6}$ in/in/° C.

Because of the relatively low expansion coefficient of the polyimide film, the thermal-induced stress in the coating will be relatively small thereby substantially eliminating the undesirable thermally induced bending losses described earlier.

In the embodiment shown in FIG. 3, the glass fiber 24' has a 140 micron outside diameter with a polyimide film protective coating averaging 10 micron thickness along the length of the fiber. The protective covering thus increases the outside diameter of the coated fiber to 160 microns. Hence, the coating accounts for only 23% of the overall cross-sectional area of the fiber. This relatively thin, low expansion coating compared to the thicker prior art coatings (with relatively high expansion coefficients) ensures that the overall distorting force due to thermal stresses at the coating/fiber interface will not develop to such a magnitude that that the above-described thermally induced bending losses occur. Furthermore, the reduced thermal stresses between the fiber and its coating will obviate the problem of the fiber detaching from the protective coating.

Although the embodiment of FIG. 3 shows a coating 26' accounting for approximately 23% of the cross-sectional area of the coated fiber, it is contemplated that a coating formed in accordance with this invention could account for as much as 50% of the cross-sectional area of the coated fiber with satifactory performance of the sensor under the conditions stated.

In the embodiment illustrated in FIG. 3, the coiled fiber optic waveguide 10 is configured to be free standing. Thus, no support member is necessary. The successive turns of the coil are secured together by any suitable adhesive 25 as noted earlier. It is clear that the above-described problem of differential thermal stresses acting between the fiber and a support member will not arise in this embodiment, however, in many applications the forces delivered by the parameter being sensed, or other environmental considerations (e.g., vibration) may be such that a support member is desirable. FIG. 4 illustrates a cross-sectional portion of a sensor where the fiber optic waveguide 10" is attached to a cylindrical support member 28 that is formed of a flexible polyimide film similar to the fiber coating. The fiber is secured to the waveguide by a suitable adhesive 30 such as the two-component epoxy phenolic type discussed earlier. Such an adhesive remains elastic throughout the operating temperature range of the device.

A fiber with a 160 micron outside diameter mounted to a polyimide support member that is 70 microns thick will operate within a temperature range having lower and upper bounds of $-65°$ C. and $175°$ C., respectively, with no separation between the support member 28 and the fiber coil 24". In some applications it is contemplated that the sensor made in accordance with this invention can be successfully operated at temperatures below $-65°$ C. to as low as $-195°$ C. Likewise, such a sensor should perform satisfactorily at temperatures higher than 175° C. to as high as 400° C.

The relatively low expansion coefficient of the support member 28 minimizes the thermal stresses between the fiber optic waveguide 10" and the support member. Furthermore, the fiber optic waveguide 10" and the support member 28 are preferably configured so that the cross-sectional area of the support member 28 averages no more than 50% of the entire cross-sectional area of the fiber optic waveguide 10" that is coiled around it. This areal relationship ensures that the overall relative thermal forces created in the support member and glass fiber will not develop to such a magnitude that the waveguide 10" develops the undesireable bending losses discussed earlier.

As another approach to reduce the differential thermal stresses between the support member and the attached fiber it is possible to construct a support member of material having essentially the same or very nearly the same expansion coefficient as that of the glass fiber. This alternative, shown in FIG. 5, comprises a coiled fiber optic waveguide 10''' incorporated into the wall of a cylindrical support member 32. In this embodiment, the support member is formed of composite material which comprises a multitude of elongate glass fibers 34 embedded within a resin matrix 36. The glass-to-resin ratio in the composite material is approximately 75:25. It can be appreciated that such a support member 32 and its incorporated coiled fiber will consist almost exclusively of a single material (i.e., glass). Thus, the magnitude of the stresses developed by differential thermal expansion or contraction between the fiber optic waveguide 10''' and support member 32 will be nominal; eliminating the problem of separation between the coiled waveguide 10''' and the support member 32. Alternatively other material, such as aramid or graphite fibers, having a low expansion coefficient (i.e., comparable to glass) can be used as the fibers in the composite material.

In some applications (e.g., when the force delivered to the sensor is large) it is necessary that a stiff but elastically deformable support member such as steel, aluminum alloy, or other metallic material be employed. As noted, it is important that the fiber be secured to the support member in such a manner that it will not separate when the support member contracts under the influence of very low temperatures. Accordingly, another alternative embodiment of the fiber optic sensor formed in accordance with this invention is shown in partial cross section in FIG. 6 and includes means for ensuring that the fiber optic waveguide 10'''' retains its position with respect to support member 38 regardless of the expansion or contraction of that support member. Specifically, support member 38 is an elastically deformable hollow metallic cylinder, formed, for example, of aluminum alloy. A buffer 40 surrounds the support member 38. The buffer 40 is formed of elastomeric material, such as the type manufactured by Dow-Corning Corp. of Midland, Mich., under the trademark SYLGARD.

The waveguide 10'''' is tightly wrapped around the buffer 40 while the sensor is at room temperature (for example, 25° C.). This tight wrapping partially compresses the buffer 40 between the waveguide 10'''' and the support member 38. When the support member 38 is exposed to low temperatures and contracts (as shown in the dotted lines of FIG. 6), the elastomeric buffer will expand, thereby ensuring that the glass fiber remains fully extended. Thus, the fiber will not be subject to unpredictable bends that could occur if the fiber separated from the support member. Although it is preferred that the fiber 24'''' of this embodiment be coated with the polyimide coating 26'''' described above, it is noted that fibers with conventional protective coatings may also be employed since the bending caused by the differential thermal stresses between the glass fiber and the coating will be overcome by the force exerted upon the fiber by the compressed buffer 40 thereby maintaining the fiber in its original curved configuration.

As another approach to ensuring that the glass fiber remains attached to a stiff support member even at very low temperatures, the glass fiber can be prestressed in tension before being affixed to the support member. The fiber is prestressed to a strain such that when the support member contracts at the lowest operating temperature, the pretensioned fiber will relax from the pre-applied tensile strain and remain in contact with the support member. Specifically, with reference to FIG. 7, a fiber optic waveguide 42 is wound around a support member 44 formed of spring steel having an expansion coefficient of approximately $18 \times 10^{-6}$ in/in/° C. If the fiber optic waveguide is secured to the support member when the temperature is 25° C. the decrease in circumference of the support member as the temperature drops to $-65$° C. is approximately $1.62 \times 10^{-3}$ in/in. When the waveguide 42 is wound around the support member, a strain equivalent to or larger than the decrease in circumference of the support member due to contraction (i.e., $1.62 \times 10^{-3}$ in/in) is imparted into the fiber by any suitable pretensioning mechanisms. The waveguide 42 is bonded to the support member at the beginning 46 and end 48 of the coiled portion. An adhesive, such as the above-described M-BOND 610 is suitable for bonding the fiber to the support member.

It can be appreciated that due to the prestressing, the waveguide 42 will relax and remain secured to the support member 44 as the support member contracts (i.e., at a rate greater than the thermal contraction of the glass fiber) under the influence of low temperatures, thereby avoiding separation problems discussed earlier. Although it is preferred that the fiber optic waveguide 42 of this embodiment be coated with the polyimide coating material discussed above, it is noted that fibers with conventional protective coatings may also be employed since the bending caused by the differential thermal stresses between the glass fiber and the coating will be overcome by the prestressing force exerted upon the fiber. In such a situation the amount of strain induced in the fiber upon prestressing should be slightly greater than the maximum decrease possible in the circumference of the support member due to thermal contraction. Hence, even at the lowest operative temperatures there will remain a strain in the fiber adequate to overcome the undesired bending due to thermal stress at the fiber coating interface.

While the invention has been described with reference to preferred embodiments, it is to be clearly understood by those skilled in the art that the invention is not limited thereto. Rather, the scope of the invention is to be interpreted only in conjunction with the appended claims.

The embodiments of the invention in which an exclusive property or privilege is claimed are defined as follows:

1. A fiber optic sensor interconnectible between a light emitting source and a receiver, the sensor being responsive to changes in an external parameter, comprising:
  (a) a fiber optic waveguide;
  (b) coating material affixed to the exterior of the fiber optic waveguide, the coating material having an expansion coefficient in the range of substantially $10 \times 10^{-6}$ to substantially $50 \times 10^{-6}$ in/in/° C.; and
  (c) a support member, the coated fiber optic waveguide being affixed to the support member, the support member being formed of material having an expansion coefficient in the range of substantially $10 \times 10^{-6}$ to substantially $50 \times 10^{-6}$ in/in/° C., the shape of the support member and the affixed waveguide being alterable in response to changes in the external parameter, the shape alterations resulting in variations in the intensity of the emitted light as it travels between the source and receiver.

2. The sensor of claim 1, wherein the cross-sectional area of the support member as measured in a plane substantially perpendicular to the longitudinal axis of the affixed fiber optic waveguide is relatively less than 50 percent of the cross-sectional area of the affixed fiber optic waveguide as measured in that plane.

3. The sensor of claim 1, wherein the support member is formed of polyimide material.

4. The sensor of claim 1, wherein the support member is formed of composite material, the composite material comprising a multitude of glass fibers embedded within a resin matrix.

5. The sensor of claim 4, wherein the fiber optic waveguide is integrally formed with the support member.

6. The sensor of claim 1, wherein the support member is formed of composite material, the composite material comprising a multitude of graphite fibers embedded within a resin matrix.

7. The sensor of claim 6, wherein the fiber optic waveguide is integrally formed with the support member.

8. The sensor of claim 1, wherein the support member is formed of composite material, the composite material comprising a multitude of aramid fibers embedded within a resin matrix.

9. The sensor of claim 8, wherein the fiber optic waveguide is integrally formed with the support member.

10. The sensor of claim 1, wherein the support member is substantially cylindrically shaped.

11. The sensor of claim 10, wherein the fiber optic waveguide is coiled into two or more successive turns, each turn of the coil being adhered to an adjacent successive turn of the coil.

12. The sensor of claim 1, wherein the coated fiber optic waveguide is affixed to the support member with an epoxy phenolic adhesive, the adhesive remaining substantially elastic despite variations in the temperature in the environment in which the fiber optic sensor is utilized.

13. A temperature independent fiber optic sensor interconnectable between a light emitting source and a light receiver for sensing changes in an external parameter operable in an environment that is subject to temperature variations comprising:
  (a) a fiber optic waveguide;
  (b) a support member for supporting the fiber optic waveguide, the shape of the support member and the supported waveguide being alterable in response to changes in the external parameter, the shape alterations resulting in variations in the intensity of the emitted light as it travels between the source and receiver;
  (c) buffer material affixed between the support member and the fiber optic waveguide to support the waveguide proximal to the support member, the buffer material being elastically deformable throughout the range of temperature variations in the environment in which the fiber optic sensor is utilized, the buffer material being configured and arranged to remain in continuous contact with both the support member and the fiber optic waveguide despite relative movement of the support member relative to the fiber optic waveguide that is caused by thermal expansion and contraction of the support member and the fiber optic waveguide.

14. The sensor of claim 13, wherein the buffer material is a partially compressed elastomeric polymer.

15. A temperature independent fiber optic sensor for sensing changes in an external parameter and operable in an environment having a temperature range defined by a first temperature and a relatively cooler second temperature comprising:
  (a) a fiber optic waveguide;
  (b) a support member, the fiber optic waveguide being permanently affixed to the support member when the fiber optic waveguide and the support member are at the first temperature, the shape of the support member and the supported waveguide being alterable in response to changes in the external parameter, the shape alterations resulting in variations in the intensity of the emitted light as it travels between the source and receivere, the support member having a length L measured along the length of the affixed waveguide when the support member is at the first temperature, the support member being subject to a decrease X in its length L when the temperature of the support member changes from the first temperature to the second temperature, the decrease defining a thermal strain X/L, the fiber optic waveguide being configured to have a tensile strain when the fiber optic waveguide is at the first temperature that is greater than or equal to the thermal strain X/L such that upon a change from the first temperature to the second temperature the fiber optic waveguide will remain affixed to the support member.

16. A fiber optic sensor interconnectable between a light emitting source and a receiver, the sensor being responsive to changes in an external parameter, comprising:
  (a) a fiber optic waveguide;
  (b) a coating material affixed to the exterior of the fiber optic waveguide, the coating material having an expansion coefficient in the range of substantially $10 \times 10^{-6}$ to substantially $50 \times 10^{-6}$ in/in/° C.; and
  (c) an adhesive adhering to the coating material for binding the fiber optic waveguide to itself in a predetermined shape, the adhesive remaining substantially elastic despite variations in the temperature in the environment in which the fiber optic sensor is utilized, the predetermined shape being alterable in response to changes in the external parameter, the shape alterations resulting in variations in the intensity of the emitted light as it travels between the source and the receiver.

17. The sensor of claim 16, wherein the adhesive comprises an epoxy phenolic adhesive.

18. the sensor of claim 17, wherein the predetermined shape is a coil of two or more successive turns of the fiber optic waveguide, each turn being adhered to an adjacent successive turn.

* * * * *